May 4, 1943.  H. H. GARY  2,318,151
QUICK-OPENING MANHOLE
Filed July 17, 1941
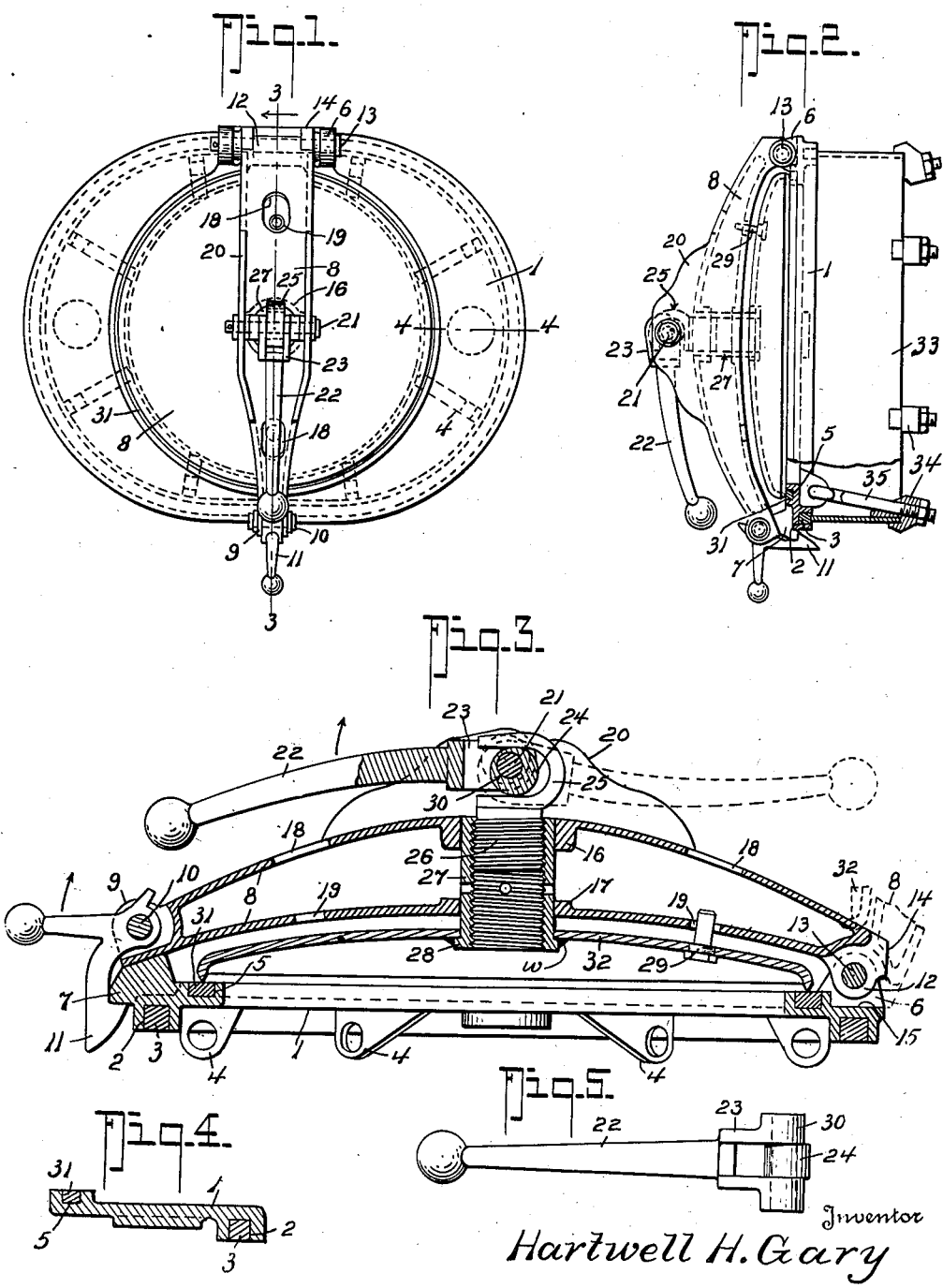

Patented May 4, 1943

2,318,151

UNITED STATES PATENT OFFICE 2,318,151

QUICK-OPENING MANHOLE

Hartwell H. Gary, Norfolk, Va.

Application July 17, 1941, Serial No. 402,853

5 Claims. (Cl. 220—57)

My invention relates to certain new and useful improvements in quick-opening manholes, handholds and the like, and it has for an object to provide an improved manhole, etc., of this type, embodying a quick-opening cover which, in closing, does not strike the gasket, but on the other hand is brought gradually and adjustably in contact with the gasket, thereby making a tight joint and, at the same time, protecting the gasket from unnecessary wear and tear, to which it is subjected in manholes hitherto generally available.

Further, the invention has for an object to provide a frame adapted to be clamped to the border ring of a manhole, to which frame a yoke is hinged and secured by a latch, the yoke carrying a cap or cover for the manhole and a cam lever for moving the cover to its seat and away from its seat after the yoke has been latched, the cam lever and the cover having cooperative connection by means of a screw joint one element of which is held by the cam of the lever and the other element of which is held by the cover, in virtue of which adjustment may be effected by turning the cap on its axis without disturbing the cam lever, means being provided for keeping the cap or cover from turning after the adjustment has been made.

Again, it is an object to provide a device of the character stated which can be manufactured at a relatively low cost, a device whose parts are of rugged construction to reduce breakage to a minimum, and a device in which the cam lever, when raised to release the cap from its seat, can, after the latch has been released, be used as a handle to aid in swinging the yoke on its hinge to its open position.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a plan or face view of my invention.

Fig. 2 is a side elevation of the same, parts being broken away.

Fig. 3 is an enlarged section on the line 3—3 of Fig. 1.

Fig. 4 is an enlarged detail section of the frame on the line 4—4 of Fig. 1.

Fig. 5 is an enlarged plan view of the cam lever per se.

In the drawing, in which like numerals of reference indicate like parts in all the figures, I designates the frame which is shaped to fit the manhole ring 33.

In the embodiment illustrated the ring 33 is somewhat oval in edge view, although other shapes may be used if desired.

The frame includes a bottom or inner groove 2 for a suitable gasket 3 that engages an edge of the ring 33 to which it is tightly held by bolts 35 hooked through the eyes of lugs 4 and having clips 34 to engage over the other edge of the ring 33 (see Fig. 2). The frame also includes a top or outer groove 5 for the gasket 31 against which the V-edge of the cap or cover 32 seats when the device is in the closed position.

The frame has ears 6 for the hinge pin 13 that passes through the ear 12 of the yoke 8. Between the ears 6 is formed a seat or stop 15 to be engaged by the seat or stop 14 on the yoke when the yoke is in the open position (see dotted lines, Fig. 3).

Diametrically opposite the hinge connection between the yoke 8 and the frame 1, the frame has a latch lug 7 to be engaged by a latch 11, which is pivoted at 10 between ears 9 on the free end of the yoke 8. The latch is so weighted as to assume the latching position by gravity when the yoke is brought into contact with lug 7.

The yoke is preferably a hollow casting having an inner (bottom) wall and an outer (top) wall. Within the yoke apertured bosses 16 and 17 are located along the axis of the yoke and cap. Slidable in the bosses 16 and 17 as guide bearings, is the tapped hub 27 of the cap or cover 32, the flange 28 of the hub 27 being welded or otherwise secured to the cap as a fixture. The yoke has sight-holes 18 in its outer wall and keeper-receiving holes 19 in its inner wall. It also has side flanges or wings 20 apertured to receive the pin 21 which passes through the cam lever bore 30 (Figs. 3 and 5). The cam lever 22 has a forked end 23 between the furcations of which the cam 24 is located. Preferably, the cam 24 is formed integrally with the lever.

The cam 24 receives a housing 25 carried by (and preferably forming an integral part of) the threaded plug 26 which screws into the tapped hub 27.

A keeper 29 is threaded into a hole in the cap 32 and projects into one or the other of the holes 19, accordingly as the cover is adjusted.

In use, when the parts are in the position shown in Figs. 1 and 2 and in full lines in Fig. 3, the cover is secured in the closed position. To open the same, lever 22 is swung over to the dotted line position (Fig. 3). This, of course, raises parts 25, 26, 27 and cap 32 so that the cap is lifted from its seat. Latch 11 is then swung up in the direction of the arrow in Fig. 3 to free the yoke, whereupon the yoke and cap can be swung (clockwise in Fig. 3) on its hinge pin 13 until stop 14 rests on stop 15, in which position the cover will remain by gravity when the manhole is a horizontal one.

Should the cam action be too soft, i. e., should the cover not be held down tight enough, it is only necessary to raise the yoke, remove keeper 19 and turn cap 32 to screw the hub 27 farther off the plug 26. The keeper is then replaced. If the action is too hard, the cap is turned in the opposite direction to screw the hub 27 farther onto the plug.

In closing the manhole, the yoke is lowered until it rests on its supporting lug 7, the cap in the meantime being prevented from coming in contact with the gasket 31 by reason of the position (dotted lines in Fig. 3) of lever 22 and the latch, when released, engages the lug 7. Cam lever 22 is then rotated to the full line position (Fig. 3), bringing the cap 32 tightly in contact with its gasket, but without shock or chafing, and thereby greatly lengthening the service life of the gasket.

When in the full line position, Fig. 3, the cam 24 will lock the cap in place by so adjusting the throw that with lever 22 moved as far in the direction opposite the arrow in Fig. 3 the cam will have passed the dead center.

From the foregoing description, taken in connection with the accompanying drawing, it is thought that the construction, operation and advantages of the invention will be clear to those skilled in the art to which it relates.

What I claim is:

1. A quick-opening manhole, comprising in combination with a frame and means to clamp it in place on a manhole ring, a yoke hinged at one end to said frame, a latch carried by the other end of the yoke, said frame having a latching lug to cooperate with said latch, said frame having a gasket, a cap to seat on said gasket to close the manhole, a tapped hub secured to said cap, said yoke having apertured guides for said hub, a cam lever pivoted to said yoke, a threaded plug engaging with said hub and having a cam housing engaging with the cam of said cam lever, and a keeper carried by said cap and engaging said yoke to hold the cap from swivelling.

2. In apparatus of the character described, the combination comprising a manhole frame, means to hold the frame in place, said frame having a gasket-holding groove, a gasket in said groove, a cap to seat on said gasket, said frame having hinge-lugs at one place and a latch-lug diametrically opposite said hinge-lugs, a yoke having lugs at each end, one lug to fit between the frame lugs, a hinge-pin passing through said lugs, said yoke and said frame having stop members to limit the opening movement of said yoke, a latch carried by said yoke at its other end for engaging the other lug of said frame to latch the yoke to the frame, said cap having an axially disposed threaded hub, said yoke having a guide passage to receive said hub, a cam lever mounted on said yoke, a cam housing and a plug member cooperatively connected with the cam of said cam lever and having threaded connection with said hub, said cap being capable of being turned on said plug for adjustment purposes, and a removable keeper carried by said cap and engaging with said yoke to hold the cap from swivelling after an adjustment has been made.

3. In apparatus of the class described, the combination with a manhole ring, of a frame having a groove containing a packing for contact with an edge of said ring, means to draw the frame and ring together tightly, said frame also having another groove containing a packing, a cap to set on the last-mentioned packing as a closure, said frame having diametrically oppositely disposed lugs, a yoke, means for hingedly connecting one end of said yoke to one of said lugs of the frame, a weighted latch carried by said yoke to engage with the other of said lugs to hold said yoke in place on said frame, and means for suspending said cap from said yoke and for bodily movement toward and from the frame, said suspending means comprising side flanges on the yoke, a cam lever pivotally mounted on and between said flanges, a cam housing located between said flanges, said yoke having a guide passage, and a threaded-together plug and hub connection between said cam housing and said cap.

4. In apparatus of the class described, the combination with a manhole ring, of a frame having a groove containing a packing for contact with an edge of said ring, means to draw the frame and ring together tightly, said frame also having another groove containing a packing, a cap to set on the last-mentioned packing as a closure, said frame having diametrically oppositely disposed lugs, a yoke, means for hingedly connecting one end of said yoke to one of said lugs of the frame, a weighted latch carried by said yoke to engage with the other of said lugs to hold said yoke in place on said frame, and means for suspending said cap from said yoke and for bodily movement toward and from the frame, said suspending means comprising side flanges on the yoke, a cam lever pivotally mounted on and between said flanges, a cam housing located between said flanges, said yoke having a guide passage, and a threaded-together plug and hub connection between said cam housing and said cap, said connection being extensible and contractable by rotating the cap on its axis, and a keeper for releasably interlocking the cap and yoke to keep the adjustment.

5. In a quick-opening manhole, a frame having a lug and being adapted to being clamped in place on a manhole ring, a hollow elongated yoke hinged at one end to said frame; a latch carried by the other end of said yoke to engage said lug; a gasket carried by said frame to seat on the manhole ring; a second gasket carried by said frame; a cap to seat on said second gasket for closing the manhole; and adjustable means cooperative with said yoke for pressing and securing said cap on its seat, said means comprising an internally threaded hub rigidly secured to said cap and passing slidably through apertures in said yoke, a plug threaded into said hub and projecting above said yoke and terminating in a cam housing, spaced flanges on said cap between which said cam housing lies, a cam lever pivoted between said flanges and engaging said housing, by virtue of all of which said cap may be adjusted with respect to said yoke so as to press tightly on said second gasket regardless of wear; and means to prevent swivelling of said cap on said hub, said last named means comprising a keeper removably secured to said cap and projecting freely into a hole in the wall of said yoke.

HARTWELL H. GARY.